United States Patent
Nicolau (10) Patent No.: US 9,374,712 B2
(45) Date of Patent: Jun. 21, 2016

(54) MULTI-ISSUER SECURE ELEMENT PARTITION ARCHITECTURE FOR NFC ENABLED DEVICES

(71) Applicant: SECURE NFC PTY. LTD., Melbourne, Victoria (AU)

(72) Inventor: Constantin M. Nicolau, Bentleigh East (AU)

(73) Assignee: SECURE NFC PTY. LTD., Melbourne (AU)

(\*) Notice: Subject to any disclaimer, the term of this patent is extended or adjusted under 35 U.S.C. 154(b) by 100 days.

(21) Appl. No.: 14/382,591

(22) PCT Filed: Apr. 17, 2013

(86) PCT No.: PCT/AU2013/000400
§ 371 (c)(1),
(2) Date: Sep. 3, 2014

(87) PCT Pub. No.: WO2013/155563
PCT Pub. Date: Oct. 24, 2013

(65) Prior Publication Data
US 2015/0033291 A1    Jan. 29, 2015

(30) Foreign Application Priority Data

Apr. 17, 2012 (AU) .................. 2012901495
Mar. 22, 2013 (WO) ............. PCT/AU2013/000299

(51) Int. Cl.
*G06F 7/04* (2006.01)
*H04W 12/08* (2009.01)
*G06Q 20/32* (2012.01)
*G06Q 20/34* (2012.01)
*H04W 4/00* (2009.01)
*H04W 12/04* (2009.01)

(52) U.S. Cl.
CPC .......... *H04W 12/08* (2013.01); *G06Q 20/3278* (2013.01); *G06Q 20/3576* (2013.01); *H04W 4/008* (2013.01); *H04W 12/04* (2013.01)

(58) Field of Classification Search
CPC ..... H04W 12/08; H04W 4/008; H04W 12/04; G06Q 20/3278; G06Q 20/3576
See application file for complete search history.

(56) References Cited

U.S. PATENT DOCUMENTS

| | | | |
|---|---|---|---|
| 8,255,687 B1 \* | 8/2012 | Pelly ....................... | H04L 9/083 380/278 |
| 2008/0051059 A1 | 2/2008 | Fisher | |
| 2009/0065572 A1 \* | 3/2009 | Jain .................. | G06K 19/07739 235/379 |

(Continued)

FOREIGN PATENT DOCUMENTS

WO    2005066802 A1    7/2005

OTHER PUBLICATIONS

Ozdenizci et al.; "NFC LOYAL: A Beneficial Model to Promote Loyalty on Smart Cards of Mobile Devices" www.nfclab.com/presentations.html; Nov. 8, 2010; 20 pages.

(Continued)

*Primary Examiner* — Techane Gergiso
(74) *Attorney, Agent, or Firm* — Miltons IP/p.i.

(57) ABSTRACT

A method for providing secure element partitions for an NFC enabled device for a plurality of card issuers, the method comprising creating in a secure element of the NFC enabled device a plurality of secure element partitions; and allocating said secure element partitions of the secure element to the respective card issuers.

12 Claims, 7 Drawing Sheets

(56) References Cited

U.S. PATENT DOCUMENTS

| | | | | |
|---|---|---|---|---|
| 2009/0312011 A1* | 12/2009 | Huomo | G06K 7/0008 | 455/426.1 |
| 2010/0205432 A1* | 8/2010 | Corda | G06F 21/335 | 713/159 |
| 2010/0275269 A1* | 10/2010 | Vilmos | G06F 12/1416 | 726/28 |
| 2011/0143663 A1* | 6/2011 | Renard | G06Q 20/32 | 455/41.1 |
| 2012/0130838 A1* | 5/2012 | Koh | G06Q 20/352 | 705/26.1 |
| 2012/0159195 A1* | 6/2012 | von Behren | G06Q 20/3552 | 713/193 |
| 2012/0159612 A1* | 6/2012 | Reisgies | G06F 21/41 | 726/18 |
| 2012/0255028 A1* | 10/2012 | Williams | G06F 21/602 | 726/26 |

OTHER PUBLICATIONS

Vedat Coskun et al.; "Near Field Communication From Theory to Practice" In: "Near Field Communication"; Jan. 27, 2012; John Wiley & Sons, Ltd, Chichester, UK; XP055176810; 382 pages.

GlobalPlatform Device Technology: "Secure Element Access Control v0.10.0"; Mar. 31, 2012; http://amifan.googlecode.com/svn-history/r79/trunk/Documents/GPD_SE_Access_Control_v0_10_0.pdf; XP055176957; p. 1-81.

GlobalPlatform: "Card Specification v2.2"; Mar. 31, 2006; http://www.win.tue.nl/pinpasjc/docs/GPCardSpec_v2.2.pdf; XP055176719; 375 pages.

Supplemental European Search Report issued on corresponding European Patent Application No. 13778203 on Mar. 24, 2015; 2 pages.

* cited by examiner

MULTI-ISSUER SECURE ELEMENT PARTITION ARCHITECTURE FOR NFC ENABLED DEVICES

RELATED APPLICATION

This application is based on and claims the benefit of the filing and priority dates of AU application no. 2012901495 filed 17 Apr. 2012, the content of which as filed is incorporated herein by reference in its entirety.

FIELD OF THE INVENTION

The invention relates to the field of information technology security (ITS), and particularly, but not exclusively, to a multi-issuer architecture to enable the coexistence of the Secure Element partitions allocated to each card issuer within NFC enabled devices such as mobile smart-phones.

BACKGROUND OF THE INVENTION

The Near Field Communications (NFC) standard (18000-3) defines the communication protocol between peer to peer NFC active devices and also between NFC active devices and NFC passive "tags" in terms of flow control, message formats, speed (106 Kbs/Miller coding 100% modulation to 424 Kbs/Manchester coding 1% modulation) and frequency (13.56 MHz), but not a methodology for managing multiple Secure Element (SE) partitions.

An SE is a tamper proof (PCI/PED-like) integrated circuit card (ICC) chip/SIM card/micro-SD (Secure Digital) module capable of embedding smart card-grade applications (e.g., payment, ticketing, access control, etc.) security features. The SE is connected to an NFC chip, which acts as a contactless front end radio frequency (RFID) interface and contains among other things the Card-Issuer's security domain Access Control data (used to manage multiple Application Security Domains which in turn contain the Application Developer's security domain Access Control data).

NFC technology provides high data transmission speed, communications protocol simplicity and low cost, but NFC technology has introduced security vulnerabilities that allow, for example: i) eavesdropping by unauthorized parties ('snooping'), data modification or insertion, ii) data manipulation, corruption and insertion by impersonators ('phishing'), and iii) denial of service ('jamming') and virus attacks by supposedly trusted parties.

To protect the NFC data exchange, processing and storage privacy and integrity, the major Card Issuers have formed alliances with either the mobile operating systems developers or the NFC device manufacturers, and implemented proprietary proof-of-end point protocols using public key signatures and message encryption and authentication.

However, an NFC enabled device (such as a smart-phone) is generally the property of—or at least for the exclusive use of—an individual consumer. Such a consumer may have multiple credit cards, electronic wallets or the like provided by a plurality of financial or other institutions, but the current dedicated security solutions and SE management methodologies do not permit the existence of multiple SE on the same NFC enabled device.

SUMMARY OF THE INVENTION

According to a first broad aspect of the invention, there is provided a method for providing secure element partitions for an NFC enabled device for a plurality of card issuers, the method comprising:

creating in a secure element (and in some cases in more than one secure element) of the NFC enabled device a plurality of secure element partitions; and allocating said secure element partitions of the secure element (or secure elements) to the respective card issuers.

The method may include creating or locating in a memory of the NFC enabled device the secure element (or secure elements).

It will be appreciated that in some cases a secure element or elements will already have been created in the NFC enables device, and hence the method may merely have to locate that secure element in order to then create in the secure element(s) the secure element partitions.

The method may include one or more of the card issuers loading secure element data and programs (which may be authenticated/certified and signed) into the respective secure element partitions allocated to the respective card issuers.

For example, the card issuer's data may be loaded as a part of an Acquirer Group's Virtual Wallet, on any NFC enabled device managed by the respective Transaction Acquirer/Processor or Trusted Service Manager (TSM).

The method may include creating 8, 16 or 32 (or more) of the secure element partitions in the at least one secure element.

The method may include allocating the secure element partitions to respective cards of the respective card issuers.

The method may include creating in at least one of the secure element partitions a plurality of application security domains for storing respective software applications.

The method may include creating 2, 4 or 8 (or more) of the application security domains for one or more of the card issuers.

The method may include providing in the secure element partitions respective sets of one or more cryptographic keys, wherein each of the sets of cryptographic keys is unique to one of the card issuers.

In one embodiment, each of the sets of cryptographic keys comprises 256 random byte keys. Each of the keys may comprise 8 bits. Indeed, each of the keys may comprise an ASCII character.

The memory may be in a SIM card of the device, a micro-SD of the device or a cache of the device.

The method may include providing a secure element partition loader, secure element partition manager, and a secure element partition cryptographic module in the NFC enabled device for implementing the method.

According to this aspect of the invention, there is also provided an NFC enabled device provided with secure element partitions according to the above-described method.

According to a second broad aspect of the invention, there is provided NFC enabled device, comprising:

a secure element comprising a plurality of secure element partitions;

a secure element partition loader for updating or loading executable code and data into each of the secure element partitions; and a secure element partition manager for identifying and selecting one of the secure element partitions allocated to a specific card issuer;

wherein each of the secure element partitions has a security domain comprising an access rule application master having access rules and cryptographic keys; and the NFC enabled device further comprises a secure element partition cryptographic module for controlling access to the respective security domains of the secure element partitions.

According to a third broad aspect of the invention, there is a provided computer program product that, when executed on a computer:

creating in at least one secure element (and in some cases in more than one secure element) of the NFC enabled device a plurality of secure element partitions; and allocates said secure element partitions of the secure element to the respective card issuers.

The computer program product may also create or locate in a memory of the NFC enabled device the at least one secure element.

The computer program product may also create in at least one of the secure element partitions a plurality of security domains for storing respective software applications or data or both software applications and data.

According to a fourth broad aspect of the invention, there is provided a computer readable storage medium with a computer program product according to the third broad aspect.

It should be noted that any of the various individual features of each of the above aspects of the invention, and any of the various individual features of the embodiments described herein including in the claims, can be combined as suitable and desired.

BRIEF DESCRIPTION OF THE DRAWING

In order that the invention may be more clearly ascertained, embodiments will now be described, by way of example, with reference to the accompanying drawing, in which.

DETAILED DESCRIPTIONS OF THE FIGURES

Figure 1:
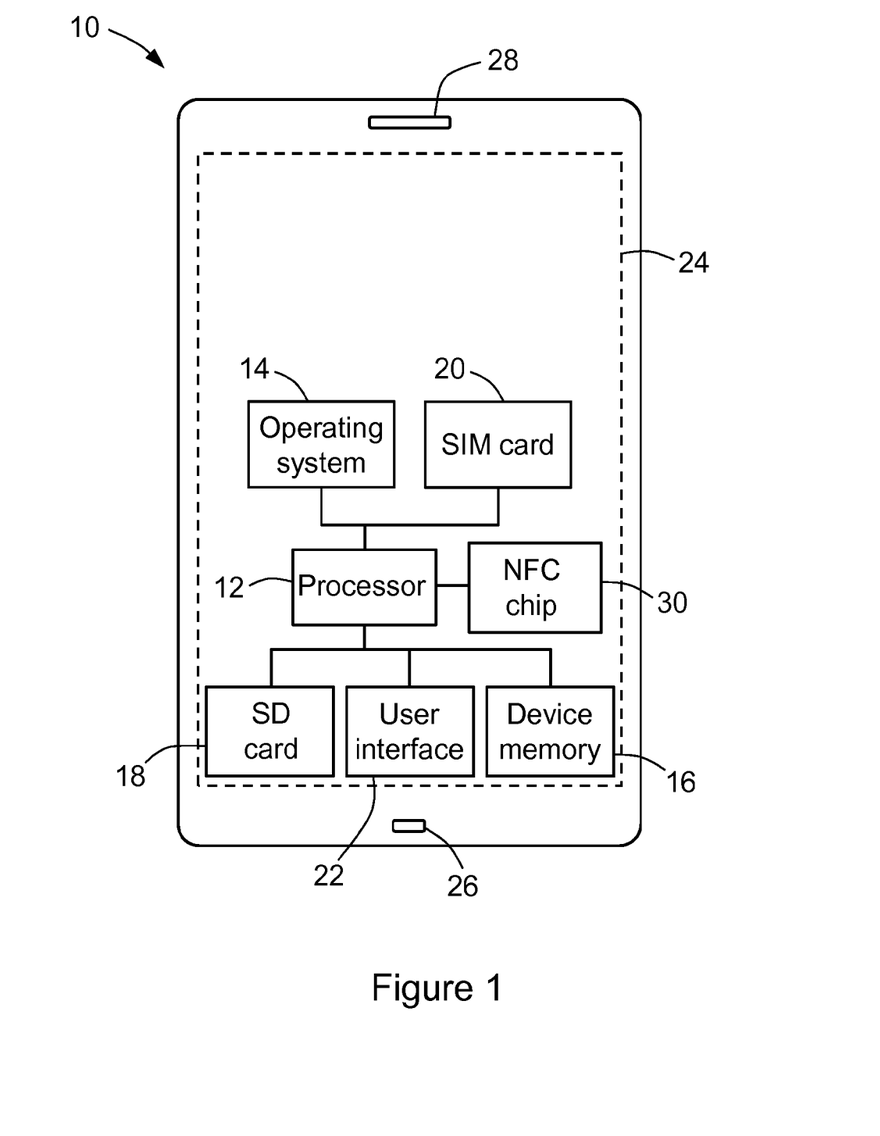
FIG. 1 is a schematic block diagram of an NFC enabled smartphone according to an embodiment of the present invention.

FIG. 1 is a schematic block diagram of an NFC enabled device, in this example a smartphone 10, according to an embodiment of the present invention. For clarity, only features are particular relevance to understanding the present invention are illustrated in the figure and described below.

Smartphone 10 includes a processor 12, an operating system 14 (e.g. Android (trade mark), iOS (trade mark), Symbian (trade mark), BlackBerry OS (trade mark) or Windows 8 (trade mark)), and two forms of memory: device memory 16 and a removable micro-SD (secure digital) memory card 18 (hereafter 'micro-SD 18'). In addition, smartphone 10 includes a SIM card 20, which has some on-board memory, and a user interface shown schematically at 22, but which includes a touch screen 24, microphone 26 and speaker 28. Smartphone 10 also includes an NFC chip 30.

Figure 2:
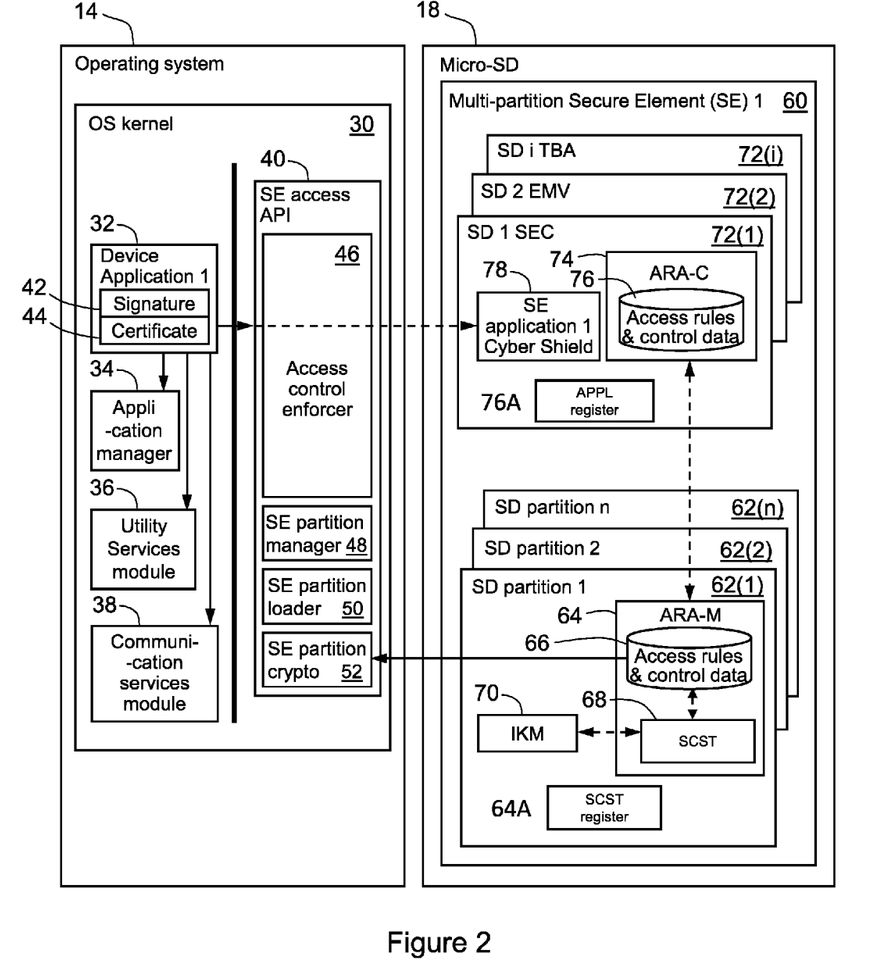
FIG. 2 is a schematic block diagram of some of the operational components of the operating system and the micro-SD of the smartphone of FIG. 1.

FIG. 2 is a schematic block diagram of some of the operational components of operating system 14 and micro-SD 18 according to the present embodiment. Operating system 14 includes an operating system (OS) kernel 30, which includes one or more device applications 32 (of which only a first exemplary device application is shown for clarity), an application manager 34, utility services module 36, communications services module 38 and an secure element (SE) access API 40. Each device application 32 includes a digital signature 42 and a digital certificate 44, and is in data communication with application manager 34, utility services module 36 and communications services module 38. SE access API 40 includes an access control enforcer 46 (an API defined by GlobalPlatform (trade mark)), and program modules that implement various functions of the present embodiment, including an SE partition manager 48, whose main role is to identify and select the SE partition allocated in a specific card to a specific card issuer, an SE partition loader 50, whose main role is to either update (or replace) or load executable code and data (rules, SCST, etc.) into the selected SE partition, and an SE partition cryptographic module 52, whose main role is to ensure only authorized access to the security domain (SD) access rules and SCST loaded into the selected card issuer's ARA-M of the specific SE partition.

Micro-SD 18 includes one or more multi-partition secure elements (SEs) 60 (of which only a first exemplary multi-partition SE is shown for clarity). Each multi-partition SE 60 is partitioned into a plurality of secure element (SE) partitions 62(1), 62(2), . . . , 62(n); each SE partition 62(1), 62(2), . . . 62(n) is allocated to a respective card-issuer 1, 2, . . . , n. In this embodiment, each SE 60 has—in this embodiment—8, 16 or 32 SE partitions 62(1), 62(2), . . . , 62(n).

Each SE partition 62(1), 62(2), . . . , 62(n) has an access rule application master (ARA-M) 64 that includes, in the example of SE partition 62(1), a first register 66 that stores access rules and control data of the respective card issuer and a second register 68 that stores a unique smart-card security table (SCST) of random keys generated by the respective card issuer to protect that card issuer's NFC cards. Each SE partition 62(1), 62(2), . . . , 62(n) also has an SCSI version no. register (indicated at 69 for SE partition 62(1)) with the SCST version number used by the respective card issuer. Each NFC card released by a card issuer is initialized with the unique SCST in the second register of that card issuer, so each NFC device is loaded with the respective SCSTs and SCST version numbers associated to the NFC cards expected to be used with the device (in this example, smartphone 10).

Each card issuer can thus stipulate, with its respective access rules and control data, its own set of access rules for the management and control of data in its dedicated SE partition within the multi-partition SE 60. Access control enforcer (ACE) 46 of operating system 14 controls access to ARA-M 64.

The SCST in each SE partition 62(1), 62(2), . . . , 62(n) holds different sets of security keys for securing the data in each respective SE partition 62(1), 62(2), . . . , 62(n). Any suitable technique may be employed to generate security keys, but in this embodiment each SCST is generated—by the respective card issuer—and employed using implicit key management (IKM) module 70, according to the IKM method disclosed in Australian patent application no. 2012901149 filed 22 Mar. 2012 and international patent application no. PCT/AU2013/000299 filed 22 Mar. 2013, the content of both of which is incorporated herein by reference in its entirety. Thus, the SCST in SE partition 62(1) contains 256 random byte keys of 8 bits each, employed to encrypt/decrypt data stored in the respective SE partition as described in those patent applications according to IKM module 70 to provide data integrity, privacy and non-repudiation for messages exchanged with other active (peer smart-phones, EFTPOS and other devices) or passive devices (such as contact and contactless smart-cards and TAGs). The other SE partitions contain comparable SCSTs, with different sets of keys.

In addition, each SE partition 62(1), 62(2), . . . , 62(n) can use one or more application security domains (SDs). Each application SD on a particular SE partition 62(1), 62(2), . . . , 62(n) may contain an application authorized by the card issuer to which the corresponding SE partition is allocated; each application is provided by a respective application provider.

FIG. 2 depicts examples of application SDs 72(1), 72(2), . . . , 72(i) associated with SE partition 62(1) of card issuer 1, but it will be understood that each of SE partitions 62(1), 62(2), . . . , 62(n) may have none, one or more than one application SDs. In this embodiment, each SE partition 62(1), 62(2), . . . , 62(n) contains 2, 4 or 8 application SDs 72(1), 72(2), . . . , 72(i) and hence generally 2, 4 or 8 applications (though in other embodiments there may be more application SDs per SE partition and hence correspondingly more applications). As with the number of card issuer SE partitions per SE, the number of application SDs per card issuer SE partition is limited by the memory size of the medium used to store the SEs, in this example micro-SD 18, and it is envisaged that greater numbers of card issuer SE partitions per SE and of application SDs per card issuer SE partition will be possible as the memory size of available media increases.

Application SD 72(1) of SE partition 62(1) is described below as an example, but the other application SDs of SE partition 62(1) have comparable features (though different respective applications). In this example, the application stored in application SD 72(1) is Cyber Security Shield (CSS) 74, an application for protecting the contents of NFC and other smart-cards as well as the communications between such smart-cards and NFC enable devices in terms of data integrity, privacy and non-repudiation. Application SD 72(1) also includes an access rule applications client (ARA-C) 76 that is managed by ARA-M 64 of card issuer SE partition 62(1), and an application register 77 that contains the IDs of any other card issuers that share the application (CSS 74) with the card issuer to whom SE partition 62(1) is allocated. ARA-C 76 includes a set of access rules and control data 78.

Application register 77 of shared applications (and the corresponding application registers in the other application SDs) are maintained by SE partition manager 48. As mentioned above, these application registers include data indicative of the other authorized card issuers, so that access control enforcer 46, which—as described above—controls access to ARA-M 64 of SE partition 62(1) and to the ARA-Ms of the other card issuer SE partitions, can ensure that only authorized (other) card issuers can use such applications.

In this example, application SD 72(2) of SE partition 62(1) contains EMV (which stands for 'Europay, MasterCard, Visa'), an application that provides enhanced security for credit and/or debit payment smart-cards. Application SD 72(2) includes its own access rule applications client (cf. ARA-C 76 of application SD 72(1)) that includes a set of access rules and control data and that is also managed by ARA-M 64 of card issuer SE partition 62(1), and an application register (cf. application register of application SD 72(1)) that contains the IDs of the card issuers that share this application with the card issuer to whom SE partition 62(1) is allocated.

One or more additional application SDs may be created for further applications as desired.

In this embodiment, SEs 60 are contained in micro-SD 18, but they may in other embodiments be located on SIM card 20, in a device cache (such as in device memory 16) or in some other PCI PED security module.

Figure 3:
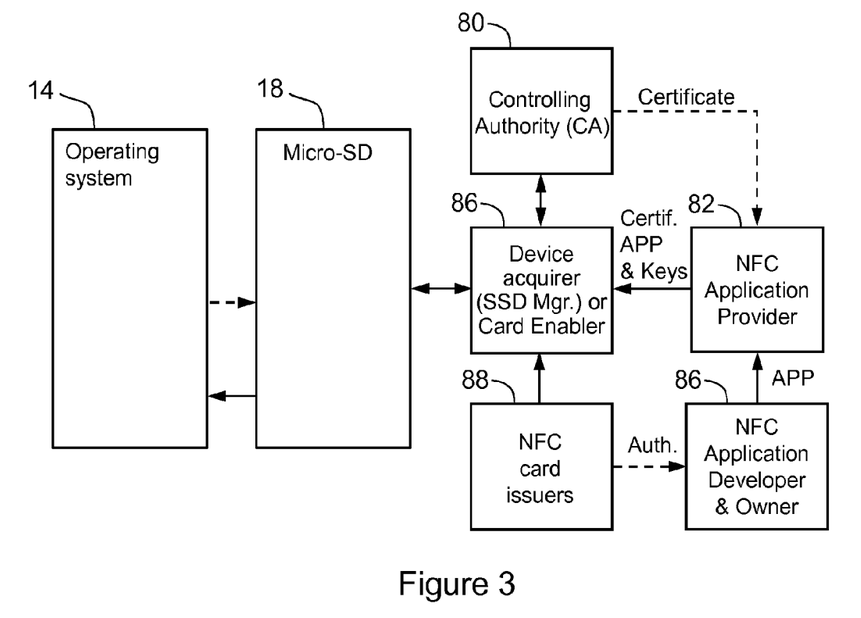
FIG. 3 is a schematic block diagram of the operating system and the micro-SD of the smartphone of FIG. 1 and their relationship to the systems of various external parties.

FIG. 3 is a schematic block diagram of operating system 14 and micro-SD 18 and their relationship to the systems of various parties, such as the card issuers, and the program modules (indicated by 'APP' in the figure) according to the present embodiment—including SE partition manager 48, SE partition loader 50 and SE partition cryptographic module 52. Referring to FIG. 3, it will be noted that a controlling authority (CA) 80 issues certificates to NFC application provider 82 that provides the program modules (and who receive them from an NFC application developer or owner 84). The NFC application provider 82 provide the program modules, certificates and cryptographic keys (for the SCST in second register 68) to NFC enables devices via a device transaction acquirer (which performs SSD management) or card enabler 86, under the control of a NFC card issuer 88 (which also gives authority to NFC application developer or owner 84 of the program modules).

Figure 4:
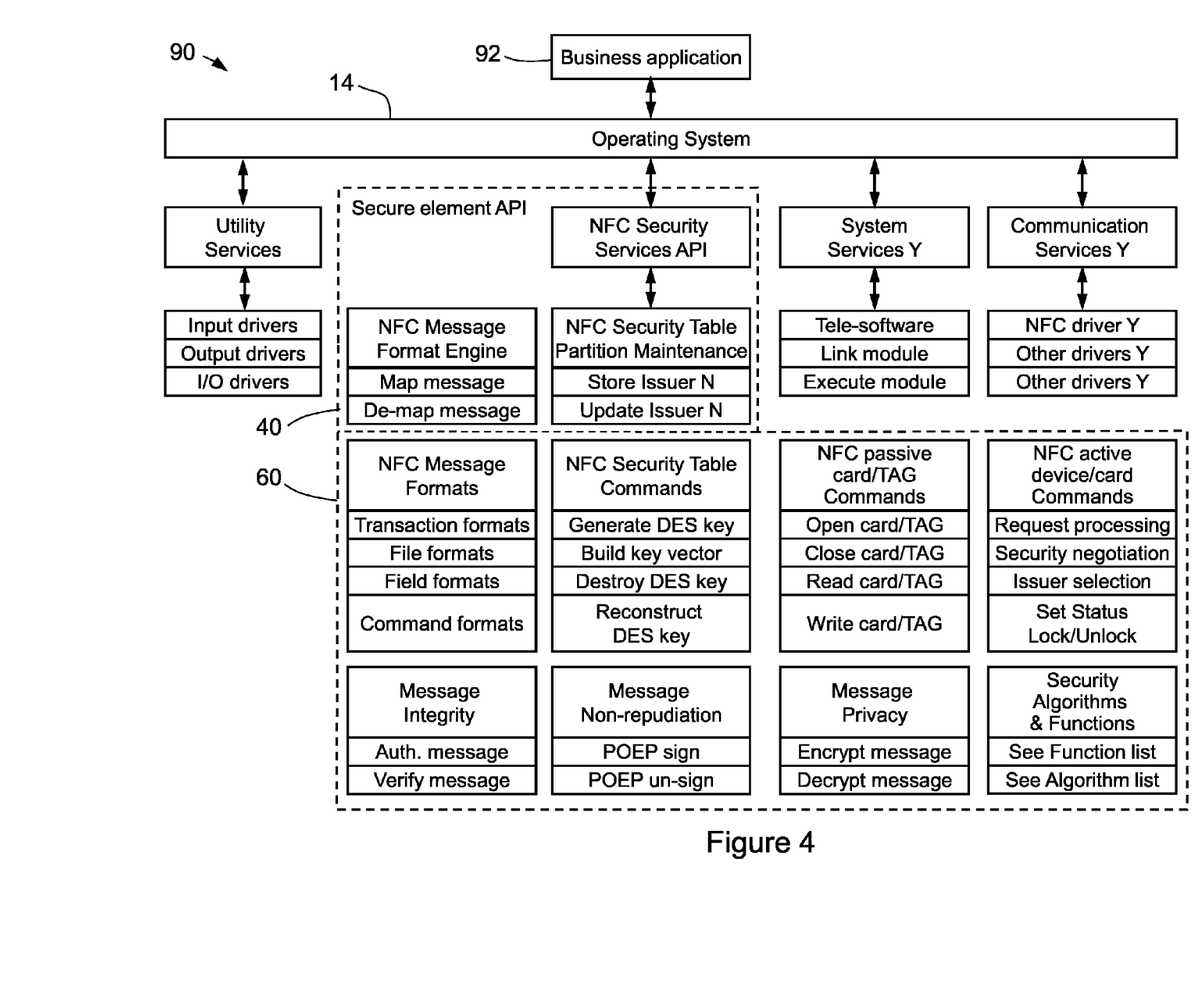
FIG. 4 is a schematic block diagram of the architecture of the smartphone of FIG. 1.

FIG. 4 is a schematic block diagram 90 of the software architecture of smartphone 10, and the integration of an SE 60 generated by a card issuer with operating system 14. The execution of various NFC security functions is transparent to smartphone 10 and card users. The proprietary NFC Security API enables applications such as business application 92 resident in smartphone 10 to perform the cryptographic functions required to provide data integrity, privacy and non-repudiation.

Figure 5A:
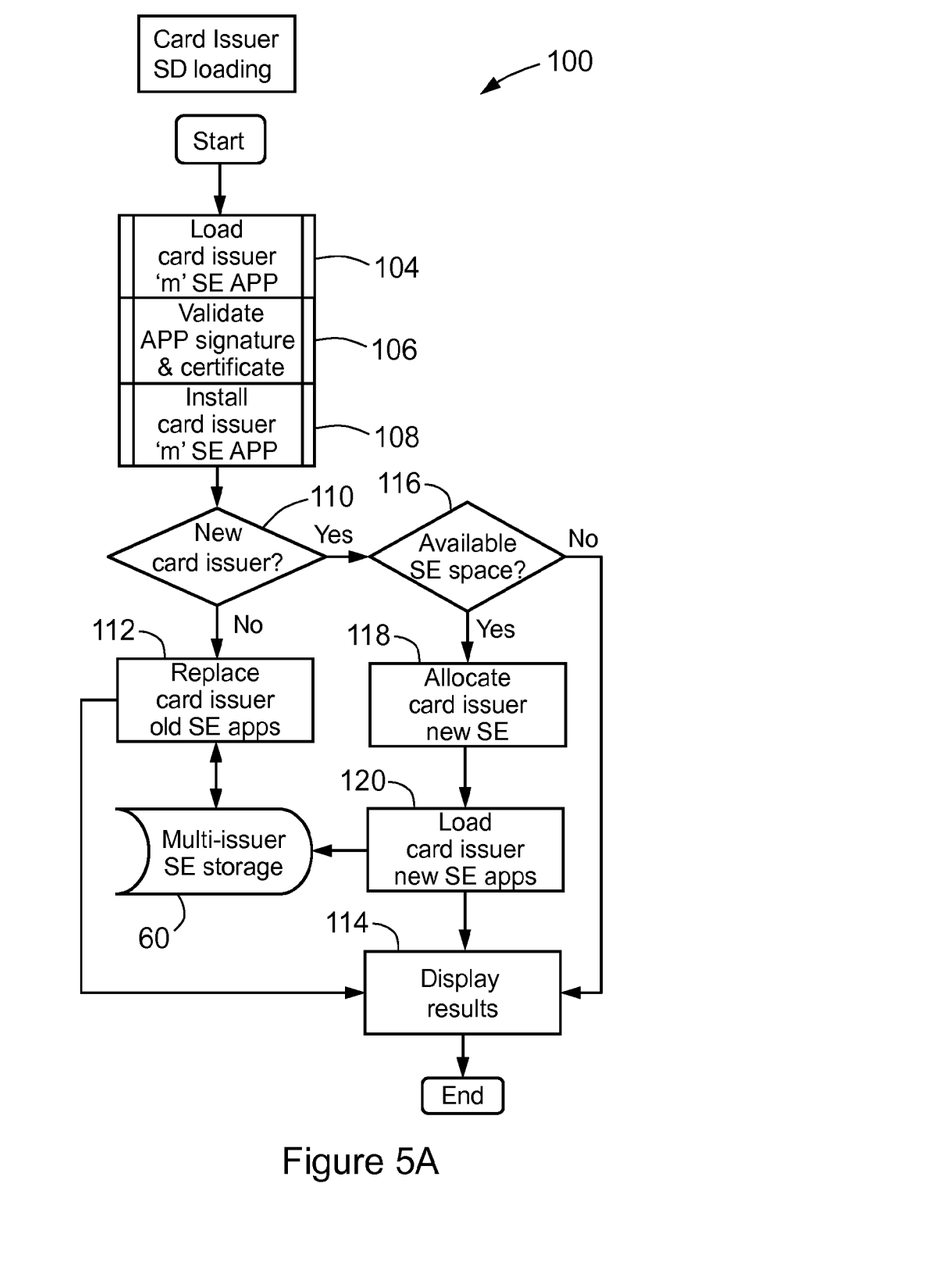
FIG. 5A is a flowchart of the installation of program modules embodying the present invention into the smartphone of FIG. 1.
Figure 5B:
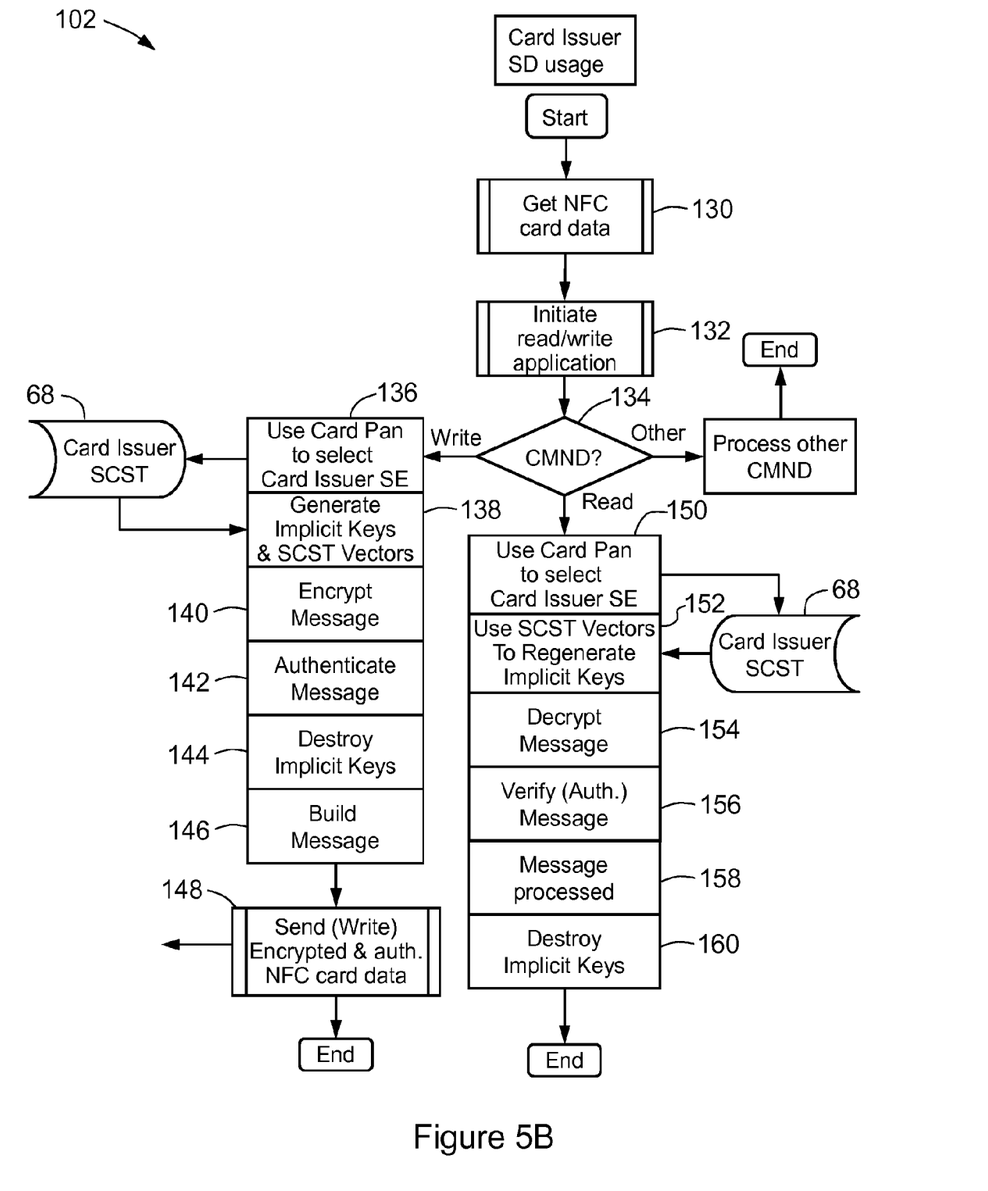
FIG. 5B is a flowchart of the use of the program modules embodying the present invention into the smartphone of FIG. 1.

FIGS. 5A and 5B are flowcharts 100, 102 of the installation and use, respectively, of the program modules that constitute the embodiment of FIGS. 1 to 3, by reference to smartphone 10; flowcharts 100, 102 describe how new SE partitions within SE 60 are allocated to new card issuers or replaced for existing card issuers, and how the SE partition particulars (data, programs, etc.) are used to protect messages exchanged with third party active or passive devices.

Flowchart 100 of FIG. 5A shows how NFC devices such as smartphone 10 are loaded with a unique SCST for each card issuer and with the program modules that implement the embodiment of FIGS. 1 to 3, which constitute an NFC security software product for protecting smartphone 10 against security attacks, and how each of SE partitions 62(1), 62(2), . . . , 62(n) allocated to the card issuers are used to process incoming and outgoing messages between smartphone 10 and either an NFC card or another NFC enabled device. Flowchart 102 of FIG. 5B illustrates the use of a card issuer's SE partition (viz. SE partition 62(1), 62(2), . . . or 62(n)).

Referring to flowchart 100 of FIG. 5A, the SCST and the aforementioned program modules are downloaded either inhouse by the equipment manufacturer (of smartphone 10, of micro-SD 18 or—if SE 60 is to be installed in the SIM card rather than the micro-SD—SIM card 20), supervised by the card issuer, or remotely by selected transaction acquirers (processors). At steps 104, therefore, the program modules for creating and managing a card issuer SE partition of card issuer 'm' (referred to in this figure collectively as the 'SE APP' for a notional card issuer 'm') are loaded onto the micro-SD 18 and, at step 106, the signature and certificate of the SE APP of card issuer 'm' are validated. These two operations can be performed by standard functions of any NFC enabled device that is adapted to validate the source (proof-of-end-point) and the certificates of any application loaded into the device via any type of interface (e.g. Wi-Fi, NFC, WAN, LAN) or from any medium (e.g. SIM, SAM, microSD, memory cache).

At step 108, the SE APP of card issuer 'm' is installed in order to provide secure functions for the card issuer SE partition of SE 60. At step 110, SE partition loader 50 checks the card issuer ID to determine whether the card issuer is an existing card issuer (i.e. an SE partition has already been allocated in SE 60 to card issuer 'm') or a new card issuer.

If SE partition loader 50 determines that the card issuer ID is indicative of an existing card issuer, processing continues at step 112, where the SE APP replaces old SE contents (applications, rules, SCSI, etc.) of card issuer 'm' with a new ones and, in doing so, applies strict version control, such that the new version must have a higher version number that the current version stored in second register 68 of the SE partition allocated to card issuer 'm'. Processing then passes to step 114, where a job completion message is displayed by an activity reporting program, then processing ends.

If SE partition loader 50 determines at step 110 that the card issuer ID is indicative of a new card issuer, processing continues at step 116, where SE partition loader 50 determines whether SE 60 has sufficient memory space to allocate a new SE partition to card issuer 'm'. If not, processing continues at step 114, where a job completion message is displayed by an activity reporting program (which indicates insufficient space), then processing ends. If at step 116 SE partition loader determines that SE 60 has sufficient memory space, processing continues at step 118, where SE partition loader 50 allocates a new SE partition in SE 60 to card issuer 'm'. Second register 68 is updated with the version control number of the card issuer's SCST. Subsequently, at step 120, one or more new card issuer authorized applications, once validated, can be loaded into the SE partition of SE 60 allocated to card issuer 'm' if in each case sufficient memory space is available for that new card issuer. Processing then passes to step 114, where a job completion message is displayed by an activity reporting program, then processing ends.

Flowchart 102 of FIG. 5B illustrates the operation of an exemplary read/write application that is configured to issue NFC commands. At step 130 the NFC card data is read and SE partition manager 48 determines the card issuer ID from the card prefix of the NFC card's personal account number (PAN). At step 132, SE partition manager 48 initiates the read/write application which, at step 134, checks whether it has been passed a read command or a write command.

If a write command is detected, processing continues at step 136 where the read/write application selects the corresponding SE partition allocated to the identified card issuer. The NFC card Write function requires that the data to be written be authenticated and encrypted before its transmission to the NFC card. Using the card issuer's SCST in second register 68, at step 138 the program modules generate a set of implicit keys and the associated vectors. At step 140 the message is encrypted by the newly generated ENCRYPT key 1 and at step 142 authenticated by the AUTH key 2. At step 144 the encryption and authentication keys are destroyed, and at step 146 the message is build by prefixing encrypted and authenticated message with the vectors associated with the implicit keys. At step 148, the resulting message is sent (viz. written) onto micro-SD 18 (or, in other examples, written to another NFC card or memory storage, or sent (posted) to a peer NFC enabled device). Processing then ends.

If, at step 134, the read/write application determines that it has been passed a read command, processing continues at step 150, where the read/write application selects the corresponding SE domain allocated to the identified card issuer. Next, at step 152 the NFC card Read function uses the vectors attached to the message/record to regenerate the implicit key used to encrypt and authenticated the message. Once the DES/3DES keys (CRYPTO and AUTH) have been regenerated, at step 154 the message is decrypted using CRYPTO key 1 and at step 156 the message authenticity is verified using AUTH key 2 for its integrity. At step 158, the message contents are processed (viz. read) and at step 160 the keys and the vectors are destroyed. Processing then ends.

Figure 6:
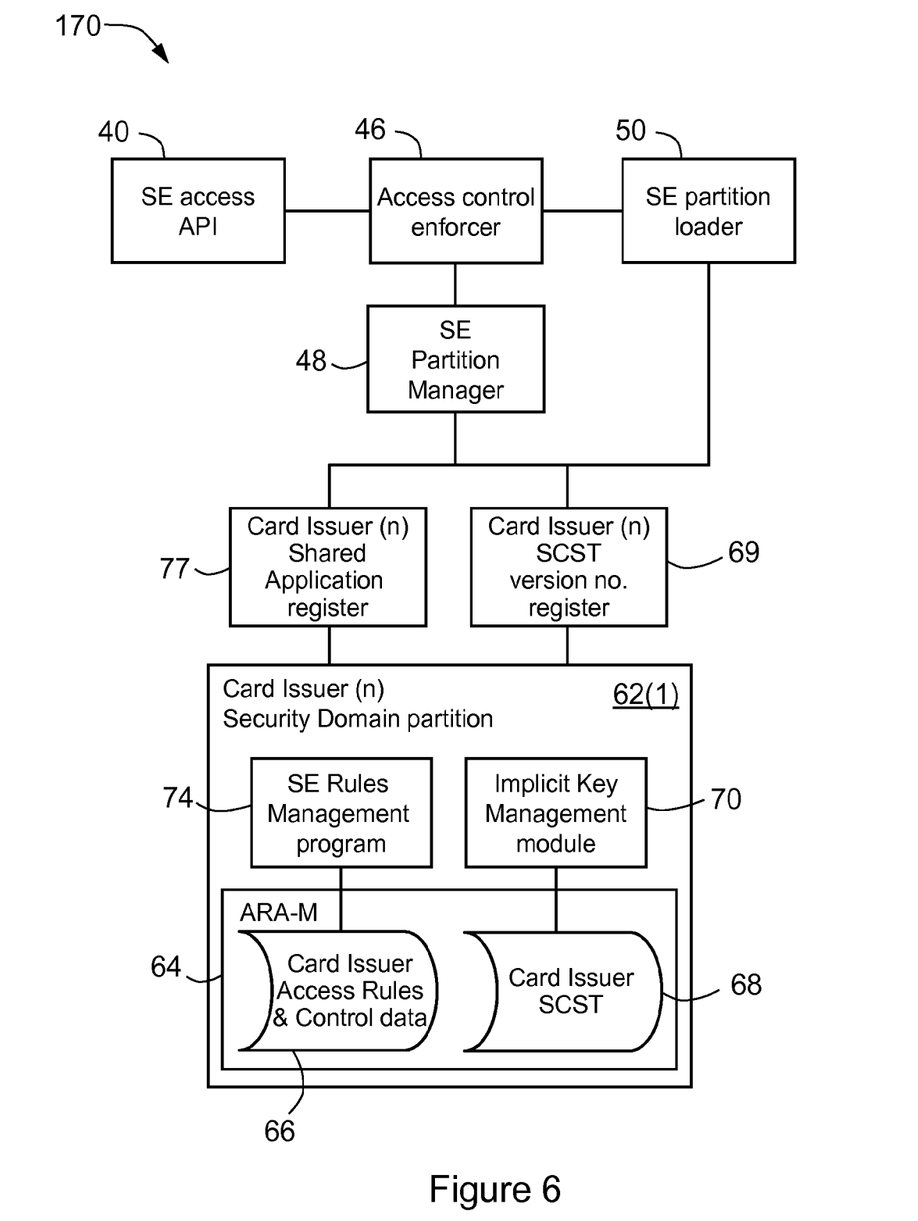
FIG. 6 is a schematic block diagram of the architecture of the multi-issuer SE partition manager of the operating system of the smartphone of FIG. 1.

Thus, an NFC enabled device may select, under the control of resident ACE 46, the correct card issuer partition upon being presented with a valid PAN or when a virtual card is selected from the card/method of payment menu by the user, as follows:
LOOK PAN prefix (Card-Issuer Prefix Table)
COMPARE PAN prefix range
 {YES} ACCESS CI-SE domain (i.e. partition)
 {NO} Invalid PAN, EXIT Signed and certified data and programs may be loaded into card issuer partitions, and maintained, upon the validation of the sender identity and the authentication of the received data contents proceed, as follows:
POEP UNSIGN (Signed CI-ID)
COMPARE CI-ID value (Card-Issuer Prefix Table)
 {YES} Authenticate Certificate (CA)
  {YES} Authenticate Message (MAC),
   {YES} Decrypt Message (DATA, Programs)
   Store DATA and/or Programs in CI-SE, EXIT
 {NO} Invalid CI-ID, or CA or MAC, EXIT The contents of the Card-Issuer's partition may be decrypted prior to the use of the specific card issuer's information and data may be encrypted and written back into the card issuer's partition, as follows:
Write Card/Record Process
 DECRYPT CI-SE contents using Implicit Key Management
 GENERATE random# to create Card Code Factor (CCF)
 ENCIPHER data message using CCF key,
 WRITE to NFC card, EXIT
Read Card/Record Process
 DECRYPT CI-SE contents using Implicit Key Management
 GET random# (challenge) to create Card Code Factor (CCF)
 DECIPHER data message using CCF key, EXIT FIG. 6 is a schematic block diagram 170 of the architecture of the multi-issuer SE partition manager 48 of operating system 14, according to this embodiment. Access control enforcer 46 uses the services of SE partition manager 48 to manage the loading, maintenance, access and usage of each individual card issuer's SE partition in smartphone 10.

In this embodiment, the size of the SCST in second register 68 of SE partition 62(1) is only 256 bytes and the software components of this embodiment that implement the present invention are of small size in executable form (of the order of 1 KB) and shared by all SE partitions. As discussed above, application register 77 holds merely a list of the card issuers' IDs and levels of authority (execute, update, delete) for the sharing of specific applications in application SD 72(1). Consequently, the memory space required by this embodiment is very small compared to the memory space of micro-SD 10 (i.e. 32 GB) or of device memory 16 (i.e. 16 GB) of smartphone 10, or even when compared to NFC active cards (which commonly have at least 8 KB).

Modifications within the scope of the invention may be readily effected by those skilled in the art.

For example, it will be apparent to the skilled person in this art that embodiments of the present invention have applications in many instances where secure data storage and security of communications between two NFC devices is required, and that numerous alterations and modifications can be made to the security method and architecture of the above-described embodiments, without departing from the basic concepts of the invention and should be considered within its scope. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in any country.

The invention claimed is:

1. A method for providing secure element partitions for an NFC enabled device for a plurality of card issuers, the method comprising:
    creating in a secure element of the NFC enabled device a plurality of secure element partitions;
    allocating said secure element partitions of the secure element to the respective card issuers;
    providing in the secure element for a plurality of the secure element partitions respectively one or more application security domains;
    wherein the secure element partitions include respectively an access rule application master having access rules and control data of the respective card issuer and a unique smart-card security table of random keys generated by the respective card issuer to protect that card issuer's NFC cards, and
    the one or more application security domains corresponding to a respective secure element partition include respectively an application, an access rule application client having a set of access rules and control data and an application register containing identities of the card issuers that share the application with the card issuer to whom the respective secure element partition is allocated.

2. A method as claimed in claim 1, including creating or locating in a memory of the NFC enabled device the secure element.

3. A method as claimed in either claim 1, including one or more of the card issuers loading secure element data and programs into the respective secure element partitions allocated to the respective card issuers.

4. A method as claimed in claim 1, including creating 8, 16 or 32 of the secure element partitions in the at least one of the secure elements.

5. A method as claimed in claim 1, including allocating the secure element partitions to respective cards of the respective card issuers.

6. A method as claimed in claim 1, including providing a first of said plurality of application security domains with a security application and security data.

7. A method as claimed in claim 1, including creating 2, 4 or 8 of the security domains for one or more of the card issuers.

8. A method as claimed in claim 1, wherein the memory is in a SIM card of the device, a micro-SD of the device or a cache of the device.

9. A method as claimed in claim 1, including providing a secure element partition loader, secure element partition manager, and a secure element partition cryptographic module in the NFC enabled device for implementing the method.

10. An NFC enabled device, comprising:
    secure element partitions created by creating the secure element partitions in a secure element of the NFC enabled device,
    allocating said secure element partitions of the secure element to respective card issuers, and
    providing in the secure element for a plurality of the secure element partitions respectively one or more application security domains;
    wherein the secure element partitions include respectively an access rule application master having access rules and control data of the respective card issuer and a unique smart-card security table of random keys generated by the respective card issuer to protect that card issuer's NFC cards, and
    the one or more application security domains corresponding to a respective secure element partition include respectively an application, an access rule application client having a set of access rules and control data and an application register containing identities of the card issuers that share the application with the card issuer to whom the respective secure element partition is allocated.

11. An NFC enabled device as claimed in claim 10, further comprising:
    a secure element partition loader for updating or loading executable code and data into each of the secure element partitions; and
    a secure element partition manager for identifying and selecting one of the secure element partitions allocated to a specific card issuer;
    wherein the NFC enabled device further comprises a secure element partition cryptographic module for controlling access to the respective security domains of the secure element partitions.

12. A non-transitory computer readable storage medium with a computer program product that, when executed on a computer:
    creates in at least one secure element of the NFC enables device a plurality of secure element partitions;
    allocates said secure element partitions of the secure element to respective card issuers; and
    providing in the secure element for a plurality of the secure element partitions respectively one or more application security domains; wherein the secure element partitions include respectively an access rule application master having access rules and control data of the respective card issuer and a unique smart-card security table of random keys generated by the respective card issuer to protect that card issuer's NFC cards, and
    the one or more application security domains corresponding to a respective secure element partition include respectively an application, an access rule application client having a set of access rules and control data and an application register containing identities of the card issuers that share the application with the card issuer to whom the respective secure element partition is allocated.

* * * * *